Patented Dec. 13, 1949

2,491,444

UNITED STATES PATENT OFFICE 2,491,444

COLOR STABILIZATION OF VINYL HALIDE COPOLYMERS

Fred W. Cox, Birmingham, Ala., and James M. Wallace, Jr., Akron, Ohio, assignors to Wingfoot Corporation, Akron, Ohio, a corporation of Delaware No Drawing. Application September 18, 1945, Serial No. 617,171

4 Claims. (Cl. 260—45.9)

This invention relates to the stabilization of copolymers of vinyl halide and particularly the vinyl halide resins which are copolymers of at least 70 percent of vinyl halide and at least 2 percent of another polymerizable mono-olefinic compound.

Vinyl halide copolymers generally will discolor when heated, for example at a temperature of 100° C. or higher. It has been discovered that the addition of a small proportion of a metallic nitrate or metallic nitrite will enable the resin to resist the discoloration effect for substantial periods of time.

The vinyl halide copolymers which may be stabilized in accordance with this invention include copolymers of the vinyl halides of the group consisting of vinyl chloride, vinyl bromide, vinyl fluoride and vinyl iodide. The vinyl halide copolymers are copolymers of 70 to 98 percent of the vinyl halide and from 2 to 30 percent of another polymerizable mono-olefinic compound. Although any polymerizable mono-olefinic compound which is compatible with the vinyl halide in polymeric form, that is, which forms copolymers therewith, may be stabilized, the invention is particularly useful in the treatment of copolymers of monomeric mixtures of vinyl halide and from 2 to 30 percent of vinyl acetate, vinylidene chloride, styrene, the alkyl fumarates including the dialkyl maleates, the alkyl maleates, the alkyl chloro maleates including the dialkyl chloromaleates, the alkyl chloro fumarates including the dialkyl chlorofumarates, the alkyl acrylates, or the alpha substituted alkyl acrylates. The copolymers which are of particular importance are those of 80 to 95 percent of the vinyl halide and from 5 to 20 percent of the other monomer.

The stabilization against discoloration upon heating is effected by the addition of the metallic nitrate or nitrite. Although any member of these classes of compounds is useful, for reasons of economy the better known and less expensive salts are preferred, for example, sodium nitrate, sodium nitrite, potassium nitrate, potassium nitrite, ammonium nitrate, calcium nitrate, calcium nitrite, magnesium nitrate, zinc nitrate and lead nitrate. The quantity of stabilizing agent used will depend upon the severity of the heating to which the vinyl copolymer will ultimately be subjected. Even traces of the agent will produce a beneficial effect where only mild heating is to be encountered. Although from 0.05 to 10 percent by weight, based on the copolymer content of the resin will produce useful compositions, generally it is desirable to use from 0.5 to 5 percent of the metallic nitrate or nitrite.

The stabilizing agent may be incorporated by any of several methods. It may be added to the solid copolymer and mixed therein by means of a roll mill or other mixing machine adapted to blend solid plastic materials. The mixing machine may be heated during the mixing operation to render the copolymers more plastic. Alternatively, the stabilizing agent may be dissolved in any suitable solvent and the solution then mixed with the copolymer. The vinyl halide copolymer may be dissolved in a solvent, such as ethylene dichloride, and the stabilizing agent added to the solution and dispersed therein by means of any stirring device. If the copolymers are prepared by polymerization in an aqueous emulsion, the stabilizing agent may be added and distributed through the copolymer prior to coagulation. Any other method which permits a uniform distribution of the metallic nitrate or nitrite throughout the copolymer may be used.

The stabilizing copolymers may be used in the preparation of cast films or in the fabrication of molded or extruded shapes which uses are well known to the art. The vinyl halide copolymers stabilized with metallic nitrates or nitrites are particularly useful in the preparation of transparent or light colored articles in which discoloration of the resin is undesirable. Further details of the invention are set forth with respect to the following example.

Example

Several 10 gram samples of a copolymer of 90 percent vinyl chloride and 10 percent diethyl fumarate were each milled with 2 ml. of dibutyl sebacate. Each of these samples was milled with 0.2 gram of one of the following materials: sodium nitrite, sodium nitrate, potassium nitrite, potassium nitrate, calcium nitrate, magnesium nitrate, zinc nitrate, barium nitrate and bismuth nitrate. One of the samples was used as a control for purposes of comparison and was not compounded with any metallic nitrite or nitrate. All of the copolymer samples were milled separately on a laboratory-size chromium-plated roll mill for 5 minutes at 140° F. and then for 5 minutes at 212° F. The copolymers were finally rolled into sheets 1 mm. in thickness. Test specimens were cut from each of the copolymer sheets and were tested by heating at 135° C. It was found that all of the nitrates and nitrites were useful in stabilizing the copolymers and minimized the discoloration effect of the heating at 135° C. The copolymer specimen which was not compounded with the metallic nitrates and nitrites was badly discolored.

This application is a continuation in part of application Serial No. 502,307 filed September 14, 1943 now abandoned.

Although the invention has been described with respect to a specific example, it is not intended that the details thereof shall be construed as a limitation upon the scope of the invention except to the extent incorporated in the following claims.

We claim:

1. A vinyl halide resin capable of resisting discoloration upon heating which comprises a solid copolymer of 70 to 98 percent by weight of a vinyl halide and from 2 to 30 percent of an ester having the following structural formula.

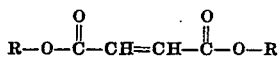

wherein R is an alkyl radical, said copolymer containing homogeneously dispersed therein from 0.05 to 10 percent by weight, based on the copolymer content of the resin, of sodium nitrate.

2. A vinyl halide resin capable of resisting discoloration upon heating which comprises a copolymer of from 70 to 98 percent of a vinyl halide and from 2 to 30 percent of a dialkyl fumarate, said resin containing homogeneously dispersed therein from 0.05 to 5 percent by weight, based on the copolymer, of sodium nitrate.

3. A vinyl chloride resin capable of resisting discoloration upon heating which comprises a copolymer of 80 to 95 percent vinyl chloride and 5 to 20 percent of a dialkyl fumarate, said resin containing homogeneously dispersed therein from 0.5 to 5 percent by weight, based on the copolymer, of sodium nitrate.

4. A vinyl chloride resin capable of resisting discoloration upon heating which comprises a copolymer of 80 to 95 percent vinyl chloride and 5 to 20 percent of diethyl fumarate, said resin containing homogeneously dispersed therein from 0.5 to 5 percent by weight, based on the copolymer, of sodium nitrate.

FRED W. COX.
JAMES M. WALLACE, Jr.

REFERENCES CITED

The following references are of record in the file of this patent:

UNITED STATES PATENTS

| Number | Name | Date |
|---|---|---|
| 1,983,949 | Semon | Dec. 11, 1934 |
| 2,140,921 | Rein | Dec. 20, 1938 |
| 2,157,997 | Brous | May 9, 1939 |
| 2,222,928 | Alexander | Nov. 26, 1940 |
| 2,364,227 | Lewis | Dec. 5, 1944 |
| 2,377,752 | Britton et al | June 5, 1945 |
| 2,404,780 | Arnold et al. | July 30, 1946 |

FOREIGN PATENTS

| Number | Country | Date |
|---|---|---|
| 545,703 | Great Britain | June 5, 1945 |